(12) United States Patent
Konanur et al.

(10) Patent No.: US 11,164,140 B2
(45) Date of Patent: Nov. 2, 2021

(54) PAYLOAD INSPECTOR FOR DRONES

(71) Applicant: Intel Corporation, Santa Clara, CA (US)

(72) Inventors: Anand S. Konanur, Sunnyvale, CA (US); Gabriel C. Cox, Hillsboro, OR (US); Joshua Triska, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1132 days.

(21) Appl. No.: 15/663,253

(22) Filed: Jul. 28, 2017

(65) Prior Publication Data

US 2019/0034868 A1    Jan. 31, 2019

(51) Int. Cl.
*G06Q 10/08*  (2012.01)
*B64C 39/02*  (2006.01)
*B64D 1/22*  (2006.01)
*G01N 21/25* (2006.01)

(52) U.S. Cl.
CPC ....... *G06Q 10/0832* (2013.01); *B64C 39/024* (2013.01); *B64D 1/22* (2013.01); *G01N 21/25* (2013.01); *B64C 2201/128* (2013.01); *B65D 2585/687* (2013.01)

(58) Field of Classification Search
CPC .............. G06Q 10/0832; B64C 39/024; B64C 2201/128; B64D 1/22; G01N 21/25; B65D 2585/687
See application file for complete search history.

(56) References Cited

U.S. PATENT DOCUMENTS

| | | | |
|---|---|---|---|
| 2016/0018559 A1* | 1/2016 | Levien | B63B 35/00 250/255 |
| 2016/0368604 A1* | 12/2016 | Duesterhoft | B64D 1/02 |
| 2016/0370263 A1* | 12/2016 | Duesterhoft | B64D 1/02 |
| 2018/0211213 A1* | 7/2018 | Vivier | G06Q 10/0838 |
| 2018/0364157 A1* | 12/2018 | Ghiraldi | A01C 21/007 |
| 2019/0030475 A1* | 1/2019 | Witchey | G06K 9/4604 |
| 2020/0011487 A1* | 1/2020 | Creusen | F21S 8/08 |

* cited by examiner

*Primary Examiner* — Richard M Camby
(74) *Attorney, Agent, or Firm* — Hanley, Flight & Zimmerman, LLC

(57) ABSTRACT

Methods, apparatus, systems and articles of manufacture are disclosed relating to drones. An example drone includes a payload receiving area to receive a container, a payload retainer to secure the container relative to the payload receiving area, and a spectrometer positioned relative to the payload receiving area to measure a first spectrum of a payload within the container.

10 Claims, 15 Drawing Sheets

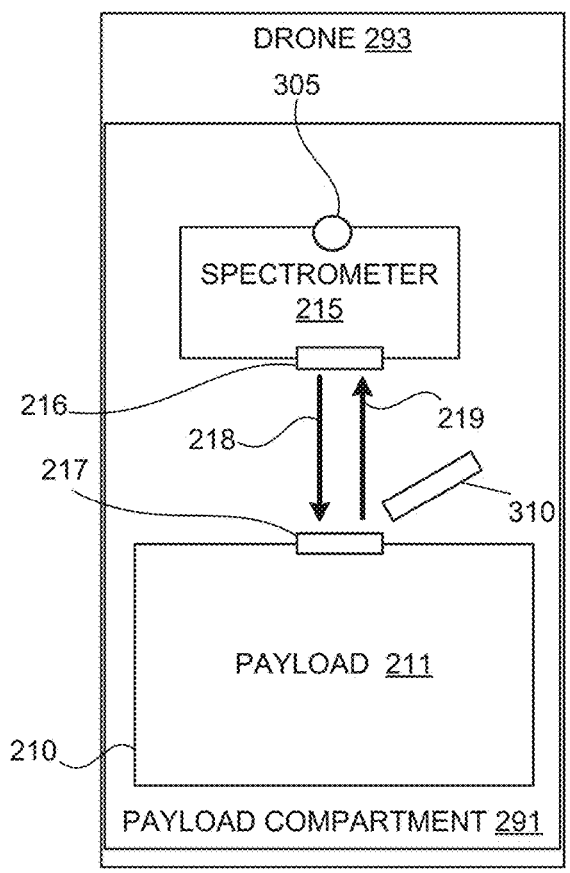
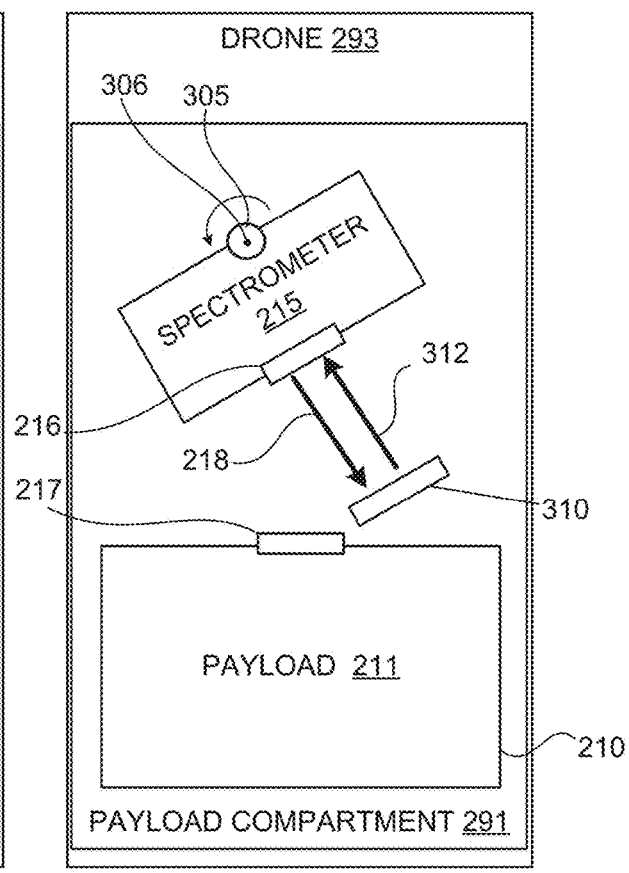
FIG. 3A  FIG. 3B

US 11,164,140 B2

PAYLOAD INSPECTOR FOR DRONES

FIELD OF THE DISCLOSURE

This disclosure relates generally to drones, and, more particularly, to a payload inspector for drones.

BACKGROUND

The current Federal Aviation Authority (FAA) commercial drone rules effectively prohibit autonomous or piloted drone delivery operations as they require a drone to remain within visual line of sight (VLOS) of a pilot. A myriad of other rules, such as prohibition of operation of drones in Class B, C, D and E airspaces (e.g., areas around airports) without an authorization or waiver from the FAA, further limit potential spheres of operation for drone delivery. While the FAA permits waiver requests under Title 14 of the Code of Federal Regulations (C.F.R.), Part 107, Section 205, for some regulatory requirements, the rules do not permit waiver of rules governing, for example, the carrying of property of another on a drone for compensation or hire, or the carrying of hazardous material (e.g., carrying batteries to other drone operators, etc.) on a drone beyond the visual line of sight of the pilot.

BRIEF DESCRIPTION OF THE DRAWINGS

FIGS. 3A-3B illustrate a first example implementation of a drone using an example spectrometer within an example payload compartment in accordance with some teachings of this disclosure.

The figures are not to scale. Wherever possible, the same reference numbers will be used throughout the drawing(s) and accompanying written description to refer to the same or like parts.

DETAILED DESCRIPTION

Figure 1:
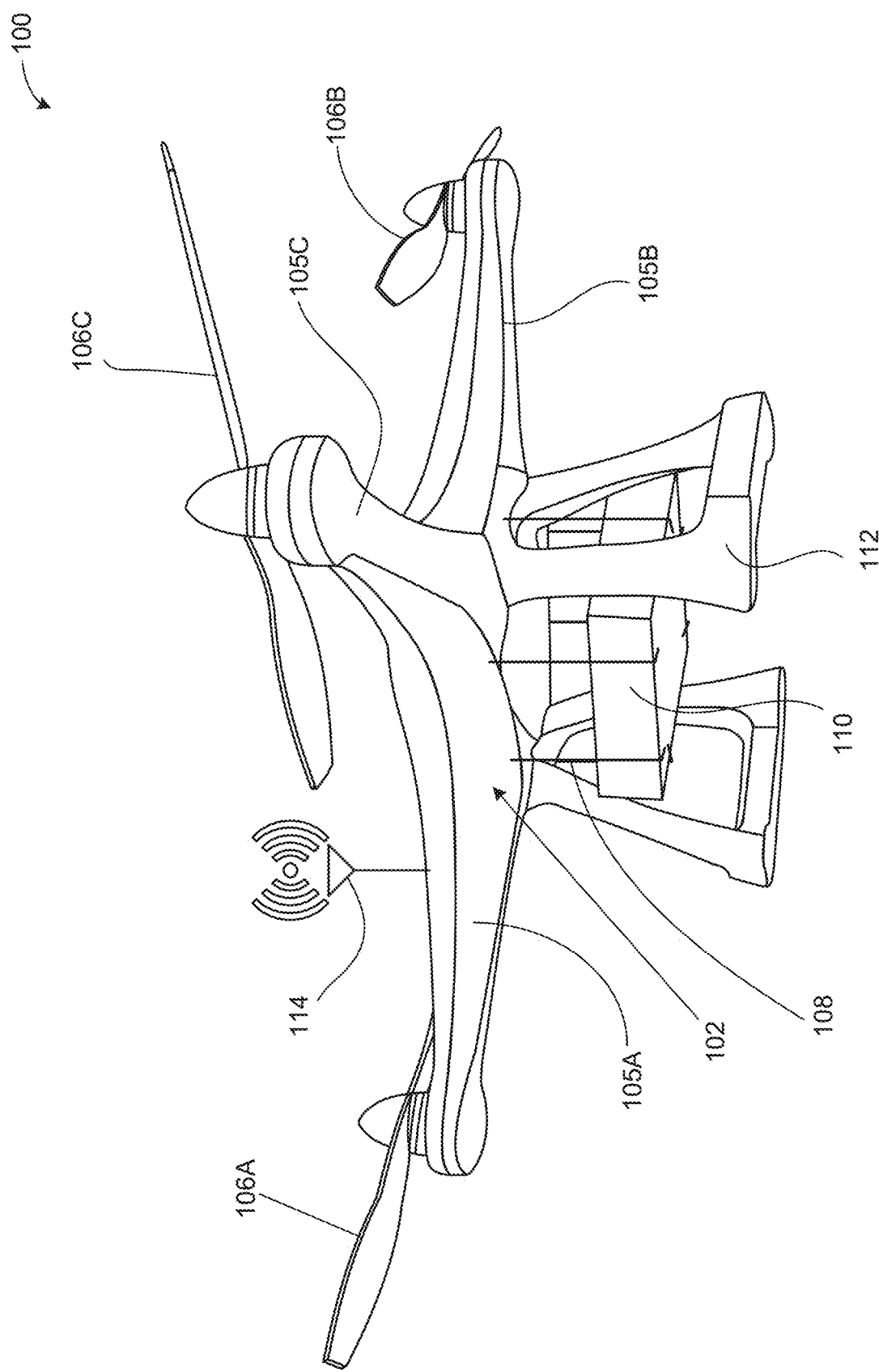
FIG. 1 is an illustration of a prior art drone.

FIG. 1 is an illustration of a prior art drone 100, also referred to as an unmanned aerial vehicle (UAV) 100 having a body 102. A first arm 105A, a second arm 105B, and a third arm 105C, are each connected to the body 102 at a proximal end and extend outwardly from the body 102 with a spacing of substantially 120° between each of the arms 105A-105C. A distal end of each of the plurality of arms 105A-105C includes a respective propeller 106a-106c driven by a motor (not shown) disposed within the respective arm 105A-105C.

Payload retainers 108 downwardly depend from the body 102 of the drone 100. These payload retainers 108 secure a payload (e.g., a container) 110 relative to the drone 100. Landing gear 112 (e.g. skids, legs, etc.) also downwardly depend from the body 102 of the drone 100 to facilitate landing of the drone 100 and to provide ground clearance sufficient to enable landing of the payload-laden drone 100.

An antenna 114 is provided to facilitate communication with, and control of, the drone 100. In some examples, the drone 100 antenna 114 is to facilitate wireless operation of the drone 100 via wireless control signals and/or to facilitate data transfer (e.g., video content, images, etc.). For instance, a first frequency (e.g., 2.4 GHz) may be used to control the drone 100 from the ground while a second frequency (e.g., 5.8 GHz) may be used to relay video (e.g., First-Person View (FPV) video) from a camera of the drone 100 to an operator of the drone 100.

Figure 2A:
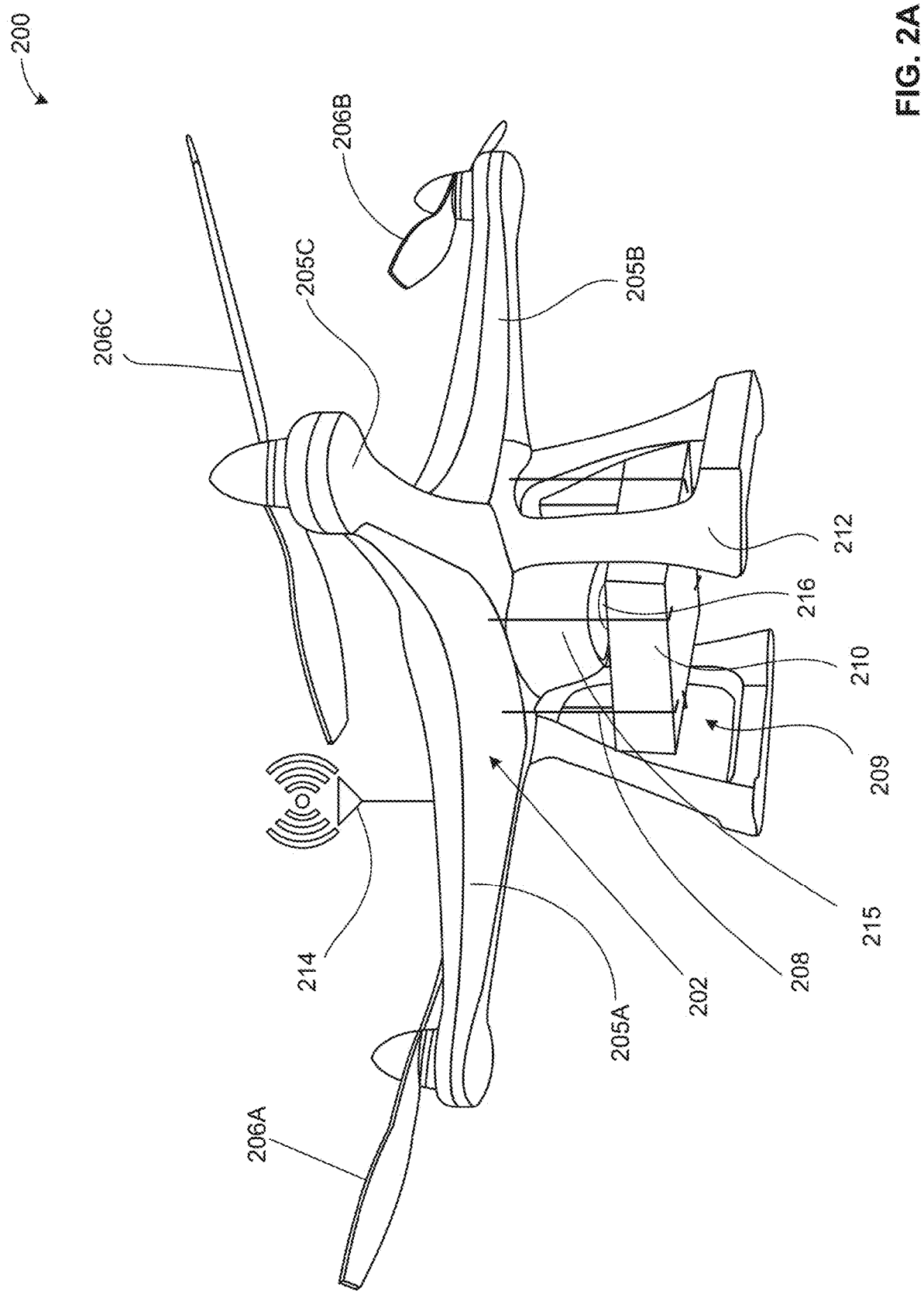
FIG. 2A is an illustration of an example drone in accordance with some teachings of this disclosure.

FIG. 2A is an illustration of an example drone 200 implemented in accordance with some teachings of this disclosure. In this example, an example body 202 of the example drone 200 is proximally connected to an example first arm 205A, an example second arm 205B, and an example third arm 205C, which extend outwardly from the body 202 with a spacing of substantially 120° between each of the arms 205A-205C. A distal end of each of the arms 205A-205C includes a respective example propeller 206A-206C driven by a motor, such as a brushless electric motor, disposed within the respective arm 205A-205C.

While FIG. 2A illustrates an example drone 200 (e.g., a multicopter) implemented in accordance with some teachings of this disclosure, the present disclosure applies to any aerial and/or terrestrial drone, whether autonomous or piloted, of any configuration. For instance, the example drone 200 may include a greater number of arms (e.g., 4 or more) and propellers or a lesser number of arms (e.g., 0, 1) and propeller(s). For instance, the example drone 200 may include a helicopter configuration with one propeller directly mounted to an output shaft of a motor centrally disposed within the example body 202. In another example, the present disclosure may be applied to a wheeled (e.g., 2 wheels, 3 wheels, 4 wheels, etc.) terrestrial drone or unmanned ground vehicle (UGV).

In the example of FIG. 2A, the example drone 200 includes example payload retainers 208 integrated with the example body 202 of the example drone 200 to secure, in an example payload receiving area 209 for the example drone 200, an example container 210 capable of bearing an example payload. In some examples, the payload retainers 208 may include a male connector or a female connector to which mating components (e.g., a female connector or a male connector, respectively) on the container 210 are secured. In some examples, the payload retainers 208 may include a hook or a movable pin to which a corresponding structure (e.g., a loop, etc.) on the container 210 is secured. One or more of the payload retainers 208 may include, for example, a male connector, female connector, hook, lock, movable pin, or end effector disposed on an arm extending from the body 202. In some examples, a payload retainer 208 may include, for example, a male connector, female connector, hook, lock, movable pin, or end effector disposed at a distal end of an arm extending from the body 202.

Example landing gear 212 (e.g. skids, legs, wheels, etc.) extend from the body 202 of the example drone 200 to facilitate landing of the drone 200 and to provide ground clearance sufficient to enable landing of the payload-laden drone 200. In some examples, the landing gear 212 are movable and/or retractable. In some examples, the landing gear 212 are fixed.

An example antenna 214 is provided on the drone 200 to facilitate communication with, and control of, the drone 200. In some examples, antenna 214 is to facilitate wireless operation of the drone 200 via wireless control signals and/or to facilitate data transfer (e.g., video content, images, etc.). For instance, a first frequency (e.g., 2.4 GHz) may be used to control the drone 200 from the ground while a second frequency (e.g., 5.8 GHz) may be used to relay video (e.g., First-Person View (FPV) video) from a camera of the drone 200 to an operator of the drone 200.

In the illustrated example of FIG. 2A, the drone 200 includes an example spectrometer 215 positioned adjacent to the payload receiving area 209 to measure a first spectrum of the payload within the container 210. The spectrometer 215 of the illustrated example measures the first spectrum of the payload through a transparent portion of the example container 210 disposed opposite an example emission outlet 216 of the example spectrometer 215. The transparent portion of the example container 210 may include, for example, a window of glass, Lexan™, a polycarbonate, BK 7, UV Grade Fused Silica, $CaF_2$, $MgF_2$, quartz, Plexiglas, etc. For instance, the transparent portion of the container 210 may include quartz, which produces a weaker and less intrusive Raman signal at an example wavelength of 785 nm than standard glass. Thus, the transparent portion may be selected to provide a Raman signal or bands falling outside of an assayed payload's anticipated spectrum. In some examples, rather than having a transparent portion, the example container 210 may be formed entirely, or at least substantially, from a transparent material (e.g., Plexiglas, Lexan™, etc.).

In some examples, the example spectrometer 215 includes a Raman spectrometer or an infrared spectrometer. For instance, the example spectrometer 215 includes a Raman spectrometer (e.g., Spontaneous Raman Spectroscopy, Resonance Raman spectroscopy (RRS), Surface Enhanced Raman spectroscopy (SERS), Coherent Anti-Stokes Raman Scattering (CARS), Stimulated Raman Spectroscopy (SRS) and Spatially Offset Raman Spectroscopy (SORS)) having a laser positioned to emit a laser excitation of a predetermined wavelength (e.g., 244 nm, 257 nm, 325 nm, 364 nm, 457 nm, 473 nm, 488 nm, 614 nm, 632 nm, 633 nm, 660 nm, 785 nm, 830 nm, 980 nm, 1064 nm, etc.) selected to provide a desired sensitivity, spatial resolution and/or measurement optimization for a particular material to be assayed. In some examples, the example spectrometer 215 may include a TM-series, TG-series and/or an MS-series mini-spectrometer or micro-spectrometer manufactured by Hamamatsu Photonics K.K. of Hamamatsu City, Japan. Additionally or alternatively, in some examples, the spectrometer 215 may include a Micro-Opto Electro Mechanical System (MOEMS) having a Fabry-Perot Interferometer (FPI) (MOEMS FPI) in a platform for visible, near infrared, infrared spectrometry, as manufactured by the VTT Technical Research Centre Of Finland Ltd., Finland.

Figure 2B:
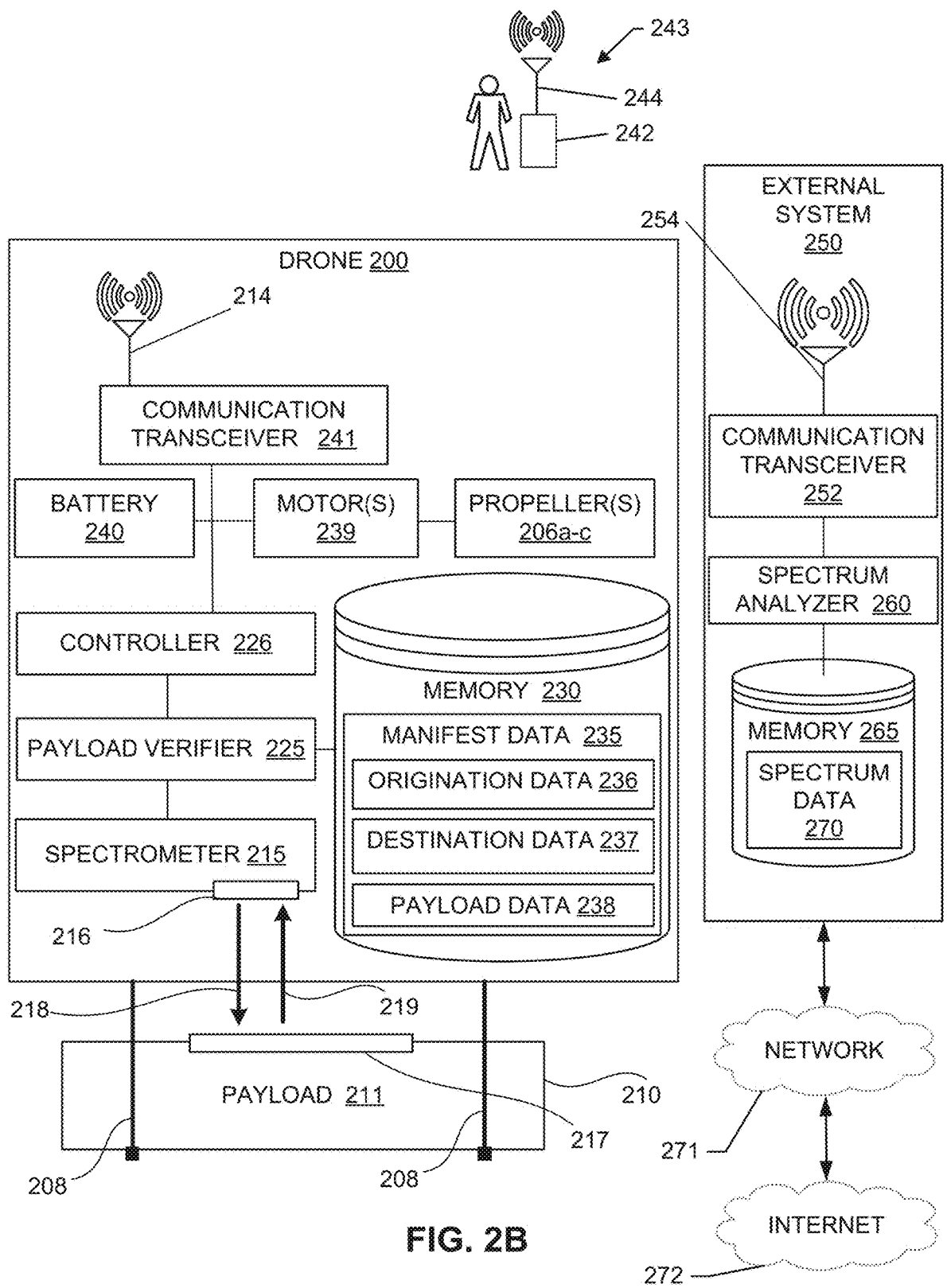
FIG. 2B is a block diagram of a first example implementation of an example drone in accordance with some teachings of this disclosure.

FIG. 2B is a block diagram of a first example implementation of the example drone 200 of FIG. 2A, which includes the example container 210 disposed externally to the drone 200. In the illustrated example of FIG. 2B, the example container 210 includes an example payload 211. In some examples, the payload 211 includes a substance (e.g., a solid, a liquid and/or a gas). In some examples, the payload 211 may include a hazardous material, as defined under section 5103 of the Federal hazardous materials transportation law (49 U.S.C. § 5103) and/or the Hazardous Materials Table (49 CFR § 172.101). In the illustrated example of FIG. 2B, the example emission outlet 216 of the spectrometer 215 is disposed opposite (e.g., directed toward) an example transparent portion 217 of the container 210. An example emission 218 of the spectrometer 215 is directed through the transparent portion 217 of the container 210 to interact with the payload 211 and to return an example first spectrum 219 representing the payload to the spectrometer 215. In some examples, the emission 218 includes a light (e.g., a laser light, etc.) of a predetermined wavelength (e.g., a wavelength ranging from ultra-violet through visible to near infra-red, etc.).

FIG. 2B shows the spectrometer 215 communicatively coupled to an example payload verifier 225, which is to compare the first spectrum 219 obtained (e.g., measured) by the spectrometer 215 to a reference spectrum corresponding to a payload declared to be contained within the container 210. In some examples, the comparison of the first spectrum 219 to the reference spectrum uses example controller 226 of the example drone 200. In some examples, if the payload verifier 225 verifies a match between the first spectrum 219 measured by the spectrometer 215 and the reference spectrum for the payload 211, which may be stored locally in an example memory 230 or which may be stored remotely. In some examples, a verified match between the example first spectrum 219 and the reference spectrum enables the drone 200 to retrieve, secure and/or convey the example container 210 from a first location (e.g., a pick-up location). In some examples, if a verified match between the first spectrum 219 and the reference spectrum is not returned by the payload verifier 225, the payload verifier 225 may abort retrieving, securing and/or conveying the container 210. In some examples, responsive to a failure to verify a match between the first spectrum 219 and the reference spectrum, the payload verifier 225 may await further instruction from an example external system 250.

In some examples, a payload to be contained within the container 210 for conveyance from a first location (e.g., a pick-up location) to a second location (e.g., a destination location) is declared when a shipper or other third-party requests use of the drone 200 to convey the container 210 from the first location to the second location. For instance, upon placing an order for use of the drone 200 to ship the container 210 from the first location to the second location, the shipper provides example manifest data 235 for the shipment including, but not limited to, example origination data 236 (e.g., GPS coordinates of pick-up location, latitude and longitude of pick-up location, physical address of pick-up location, etc.), example destination data 237 (e.g., GPS coordinates of destination location, latitude and longitude of destination location, physical address of destination location, etc.), example payload data 238, etc. In some examples, the example payload data 238 includes a description of the substance of the payload 211, a reference spectrum for the payload 211, the weight of the payload 211, the dimensions of the container 210, the weight of the container 210 and/or physical characteristics of the container 210, such as available retention elements or connectors (e.g., male/female connectors, etc.) and/or make/model information concerning the container 210. As shown in the example of FIG. 2B, the manifest data 235, such as the origination data 236, the destination data 237, and/or the payload data 238, may be stored in the memory 230 of the drone 200.

In some examples, the payload data 238 is provided in a manifest in a machine-readable form on or with the container 210. For example, the payload data 238 may be communicated via an electronic communication (e.g., a near field communication, a wireless communication, etc.) between the container 210 and the drone 200. In some examples, the payload data 238 is provided (additionally or alternatively) in a physical form or indicia (e.g., text, bar code(s), codes, etc.) readable by an optical reading device (e.g., a camera) of the drone 200 (see, e.g., FIG. 2D).

Each of the propellers 206a-206c is driven by an example motor 239 powered by an example battery 240. In some examples, the battery 240 includes one or more lithium polymer (LiPo) batteries, lithium ion (Li-ion) batteries, lithium iron phoshate (LiFePO$_4$) batteries, lithium titanate batteries and/or lithium manganese oxide (LMO) batteries. The battery 240, which may include one or more cells or batteries, is selected to provide a voltage, capacity, mass, energy capacity and energy density appropriate to a particular drone 200 and expected operational requirements or usage, such as to convey a payload within a predetermined weight range over a predetermined minimum distance between a pick-up location and a destination location. Alternatively, the propellers 206a-206c may be powered by one or more fuel-based motors (e.g., gas, nitro, etc.). In some examples, the propellers 206a-206c may be variable pitch or fixed pitch.

FIG. 2B shows the drone 200 wirelessly communicating, via an example communication transceiver 241 and the example antenna 214, to an example drone remote controller 243, or remote controller 243, including an example communication transceiver 242 and an example antenna 244. In some examples, the communication transceiver 241 includes a radio transceiver or radio receiver (e.g., a Micro Receiver, etc.), and the example communicator transceiver 242 includes a corresponding radio transceiver or radio transmitter, operating in one or more radio frequencies (e.g., 2.4 GHz, 5.8 GHz, etc.) in a frequency band appropriate to the jurisdiction in which the drone 200 is to operate. In some examples, the drone remote controller 243 used by a drone operator to fly and control the drone 200.

FIG. 2B also shows the drone 200 wirelessly communicating, via the communication transceiver 241 and the antenna 214, to an example external system 250 remotely disposed relative to the drone 200. The external system 250 includes a corresponding example communication transceiver 252 and an example antenna 254 to communicate with the antenna 214 and communication transceiver 241 of the drone 200. In some examples, the drone remote controller 243 is implemented by, or implements, the external system 250.

In some examples, each of the example communication transceiver 241 and the example communication transceiver 252 include an encryption device and/or a decryption device to facilitate encrypted communication between the example communication transceiver 241 and the example communication transceiver 252. In such examples, a party requesting transport of the container 210 and payload 211 can securely and privately transmit, or have transmitted, encrypted spectra (e.g., encrypted reference spectra) to facilitate analysis of the spectra only by the drone (e.g., example drone 200) and external system 250.

In the example of FIG. 2B, the external system 250 includes an example material spectrum analyzer 260 in communication with the communication transceiver 252 and includes example memory 265 to store example spectrum data 270. The spectrum data 270 includes a reference spectrum for the payload 211. For instance, if the payload 211 corresponding to the payload data 238 is benzene, the spectrum data 270 includes a reference spectrum for benzene. In some examples, the spectrum data 270 includes a library of reference spectra for a variety of substances.

In the illustrated example of FIG. 2B, the material spectrum analyzer 260 is to compare the first spectrum 219 measured by the spectrometer 215 to the reference spectrum in the spectrum data 270 corresponding to the payload 211. In some examples, the comparison of the first spectrum 219 and the reference spectrum includes peak analysis and fitting using a two-parameter (amplitude and position) fitting algorithm reliant on numerical line shape profiles or on analytical functions (e.g. curve fitting analysis with Gaussian function, etc.). For example, the material spectrum analyzer 260 compares the location of the peaks (frequency/wavelength/wavenumber) (e.g., indicative of molecules) and the heights of the peaks (e.g., indicative of the number of molecules present (concentration) and a strength of absorption (absorptivity)) of the first spectrum 219 and the reference spectrum. In some examples, such as shown in FIG. 2B, the external system 250 is communicatively coupled to an example network 271 and/or the Internet 272 via a hardwired and/or a wireless connection to populate the example spectrum data 270.

Thus, FIG. 2B shows an example wherein the drone 200 may be provided with origination data 236 directing the drone 200 to the pick-up area wherein it can position its spectrometer 215 to measure a first spectrum 219 of the payload 211 within the container 210. The drone 200 then transmits the measured first spectrum 219 via the communication transceiver 241, to the external system 250, which analyzes the first spectrum 219 against one or more reference spectra from the example spectrum data 270 with the material spectrum analyzer 260 of the external system 250. If the material spectrum analyzer 260 verifies a match between the first spectrum 219 measured by the spectrometer 215 and the reference spectrum corresponding to the payload 211, the material spectrum analyzer 260 transmits, to the payload verifier 225, an authorization permitting the drone 200 to retrieve, secure and/or convey the container 210 from the first location (e.g., a pick-up location). If the material spectrum analyzer 260 fails to verify a match between the first spectrum 219 measured by the spectrometer 215 and the reference spectrum corresponding to the declared payload 211, the material spectrum analyzer 260 transmits, to the payload verifier 225, a denial of authorization for the drone 200 to retrieve, secure and/or convey the container 210 from the first location. Such payload verification operations help to ensure that fraudulent, incomplete, or inaccurate manifest submissions do not permit carriage of substances that could endanger persons or property or that could violate accepted rules governing carriage of particular substances and/or classes of substances. In some examples, the external system 250 may include oversight by a local (e.g., city, county, state, etc.) regulatory authority and/or a Federal regulatory authority (e.g., the Federal Aviation Administration, etc.). In some examples, the external system 250 may be operated by a third-party service provider separate from a party providing the drone 200 carriage services.

Figure 2C:
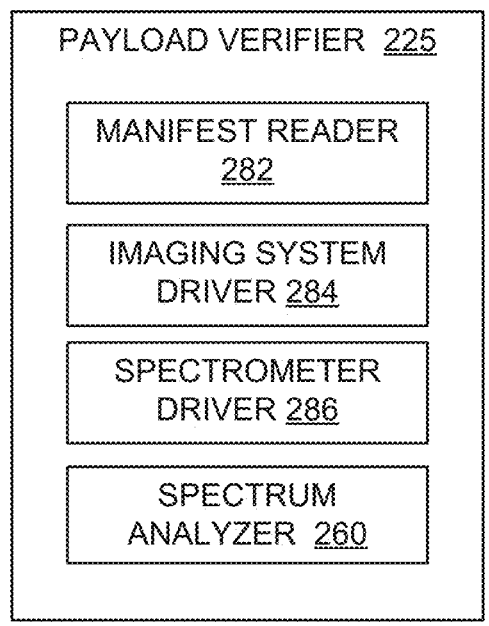
FIG. 2C is a block diagram of an example payload verifier in accordance with some teachings of this disclosure.

FIG. 2C is a block diagram of the example implementation of the payload verifier 225 of FIG. 2B. The payload verifier 225 of FIG. 2C includes an example manifest reader 282, an example imaging system driver 284, an example spectrometer driver 286, and the material spectrum analyzer 260.

The manifest reader 282 is to receive image data from one or more imaging devices positioned in, or adjacent to, the payload receiving area 209 or payload compartment and to process image data received from the one or more imaging devices (e.g., included in or carried by the drone 200, 293). For instance, the manifest reader 282 is to employ digital image processing and edge detection techniques to extract features from an manifest on the container 210 and to apply optical character recognition (OCR) techniques to the extracted features to resolve the image data into alphanumeric information (e.g., payload data 238, destination data 237, etc.).

The imaging system driver 284 is to drive operation of one or more imaging devices positioned in, or adjacent to, the payload receiving area 209 or payload compartment to obtain image data from an container 210 positioned in, or adjacent to, the payload receiving area 209 or payload compartment. For instance, the imaging system driver 284 may include a charge coupled device (CCD) driver circuit, an analog video signal processing circuit, a timing generator, a control circuit and a power supply to enable conversion of analog video signals from a CCD into digital signals. The image device(s) may include, for example, a charge coupled device (CCD), an infrared (IR) camera, a video camera, a still camera, and/or a thermographic camera included in or carried by the drone 200, 293.

Figure 2D:
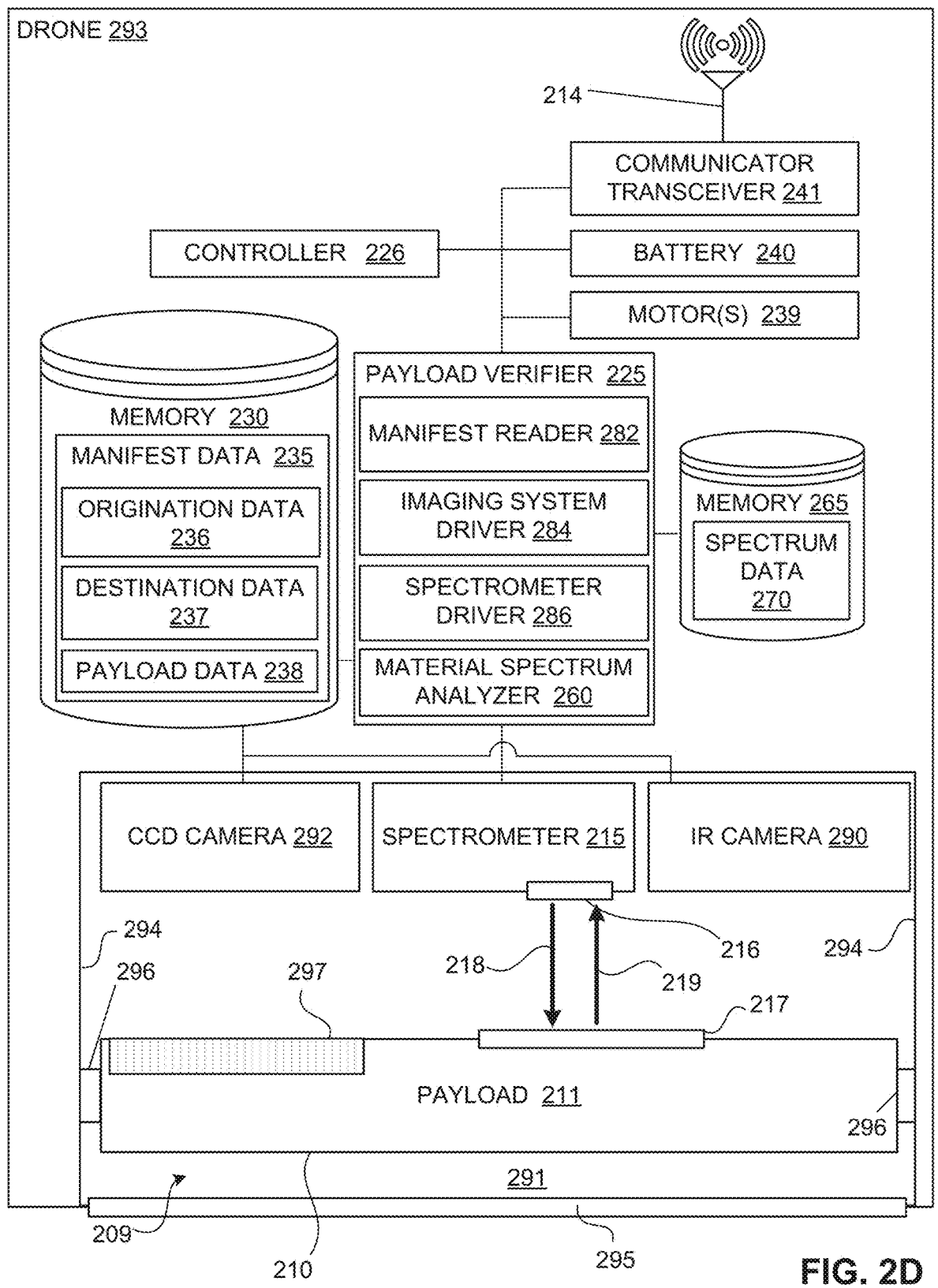
FIG. 2D is a block diagram of a second example implementation of an example drone including the example payload verifier of FIG. 2C in accordance with some teachings of this disclosure.

The spectrometer driver 286 is to drive operation of one or more spectrometers positioned in, or adjacent to, the payload receiving area 209 of the drone 200 or an example payload compartment 291 of an example drone 293, shown in FIG. 2D, to obtain spectral data from the payload 211 in the container 210 positioned in, or adjacent to, the payload receiving area 209 or the payload compartment 291 and/or to obtain spectral data from the payload receiving area 209 and/or payload compartment. The spectrometer driver 286 is to control one or more spectrometers 215 and acquire spectroscopic data. For example, the spectrometer driver 286 may include one or more libraries including one or more of a start-up library to initialize communications, calibrate the spectrometer(s), calibrate an emitter, and initialize spectrometer components such as slits and mirrors. The spectrometer driver 286 may also include, for example, one or more of a spectrometer positioner to register and control a spectrometer position during a scan, a target positioner to register a target spectral position during a scan, a focuser to focus the spectrometer, an aligner to align the spectrometer, a mirror positioner to control a mirror position via a mirror motor, a shutter positioner to control a position of a shutter via a shutter motor, a slit positioner to set a slit width via a slit motor, and/or an acquisition library to set acquisition parameters (e.g., acquisition time, acquisition mode, pre-scan delay, digitizer resolution, dwell time, oversampling dwell time, number of scans, power mode, laser power, laser wavelength, accumulations, spectrum range, etc.).

The material spectrum analyzer 260, as discussed above in relation to FIG. 2B, is to compare the first spectrum 219 to the reference spectrum in the spectrum data 270 corresponding to the declared payload 211.

FIG. 2D is a block diagram of a second example drone 293 including the payload verifier 225 of FIG. 2C. The example drone 293 includes many elements in common with the example drone 200 of FIG. 2B. As such, like elements in FIGS. 2B and 2D are labelled with the same reference numerals. However, in contrast with the example drone 200 of FIG. 2B, the example drone 293 includes the memory 265, the spectrum data 270, and the material spectrum analyzer 260 as on-board components facilitating autonomous operation or semi-autonomous operation of the drone 293. In some examples, the drone 293 may omit the communication transceiver 241 and may receive instructions (e.g., a mission plan, etc.) for autonomous execution by the drone 293 via a device (e.g., external computer, etc.) connected to the drone 293 through a port (e.g., a Universal Serial Bus (USB) port, etc.)(not shown). In some examples, the drone 293 may be piloted by a drone operator using the example drone remote controller 243 described above.

In some examples, prior to arrival of the drone 293 to the pick-up location where it is to acquire the container 210 for transport to a destination location, the drone 293 receives, via its communication transceiver 241, the manifest data 235 for the carriage. The drone 293 compares the payload 211 identified by the payload data 238 (i.e., the declared payload) to a library of reference spectrum for a variety of substances in the spectrum data 270 to determine if the spectrum data 270 includes a reference spectrum for the declared payload 211. If a match is not found, the drone 293 is to obtain a reference spectrum for the declared payload 211 from the external system 250, the network 271 or the Internet 272 of FIG. 2B. For example, if the spectrum data 270 does not include the reference spectrum for the declared payload 211, the drone 293 may use its communication transceiver 241 to obtain the reference spectrum via the external system 250, the network 271 or the Internet 272.

The drone 293 also includes one or more example imaging devices. For instance, in FIG. 2C, the drone 293 includes an example infrared (IR) camera 290 and an example CCD camera 292 within an example payload compartment 291.

The payload compartment 291 includes example walls 294 defining a space (e.g., enclosure) to receive the container 210. The payload compartment 291 includes an example door 295 movable between an open position providing access to the payload compartment 291 and a closed position enclosing the payload compartment 291. The door 295 may include a seal formed at a junction between the payload compartment 291 and the door 295 to hermetically seal or otherwise protect the payload compartment 291 when the door 295 is in the closed position.

The payload compartment 291 includes one or more example payload retainers 296 integrated within the payload compartment 291 to secure the container 210. The payload retainers 296 may include, for example, a male connector, a female connector, a hook, a movable pin, a lock, a clamp and/or an end effector to engage a corresponding structure (e.g., a loop, etc.) on the container 210 to secure the container 210 within the payload compartment 291.

In the drone 293 of FIG. 2D, the CCD camera 292 is to image, for example, an example indicia 297 on the container 210. In some examples, the indicia 297 includes writing on the container 210, such as laser engraved or etched writing of payload data 238. In some examples, the indicia 297 includes a manifest attached to an exterior of the container 210. The drone 293 of FIG. 2D also includes the IR camera 290 to image one or more portions of the container 210 and/or one or more portions of the payload compartment 291. In some examples, the IR camera 290 is a gas detection IR camera configured to discern, in real-time, one or more gases in an interior of the payload compartment 291. In some examples, the IR camera 290 is a leak detection IR camera configured to detect leakage of liquid from the container 210 via cooling effects of the leaking fluid on the material of the container 210 and/or the payload compartment 291, and/or any endothermic or exothermic interaction arising from leakage of the payload 211 from the container 210 and interaction between the payload 211 and the payload compartment 291 and/or the door 295.

While an example manner of implementing the payload verifier 225 of FIG. 2B and FIG. 2D is illustrated in FIG. 2C, one or more of the elements, processes and/or devices illustrated in FIG. 2C may be combined, divided, re-arranged, omitted, eliminated and/or implemented in any other way. Further, the payload verifier 225, the manifest reader 282, the imaging system driver 284, the spectrometer driver 286 and/or the material spectrum analyzer 260 of FIGS. 2B-2D may be implemented by hardware, software, firmware and/or any combination of hardware, software and/or firmware. Thus, for example, any of the payload verifier 225, the manifest reader 282, the imaging system driver 284, the spectrometer driver 286 and/or the material spectrum analyzer 260 of FIGS. 2B-2D could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the payload verifier 225, the manifest reader 282, the imaging system driver 284, the spectrometer driver 286 and/or the material spectrum analyzer 260 of FIGS. 2B-2D is/are hereby expressly defined to include a non-transitory computer readable storage device or storage disk such as a memory, a digital versatile disk (DVD), a compact disk (CD), a Blu-ray disk, etc. including the software and/or firmware. Further still, the payload verifier 225 of FIGS. 2B-2D may include one or more elements, processes and/or devices in addition to, or instead of, those illustrated in FIG. 2C, and/or may include more than one of any or all of the illustrated elements, processes and devices.

FIGS. 3A-3B illustrate a first example implementation of the drone 293 of FIG. 2D, which includes a spectrometer 215 within the payload compartment 291. In the illustrated example of FIGS. 3A-3B, the spectrometer 215 is mounted on an example gimbal 305 (e.g., a pivoting support) to allow rotation of the spectrometer 215 about an axis of rotation 306 and to permit movement of the spectrometer 215 between an example first position (corresponding to FIG. 3A) and an example second position (corresponding to FIG. 3B). Additionally or alternatively, the spectrometer 215 is mounted on an actuator to laterally translate the spectrometer between a first position (corresponding to FIG. 3A) and the second position (corresponding to FIG. 3B). In the first position of FIG. 3A, the spectrometer 215 is positioned to measure the first spectrum 219. In the second position of FIG. 3B, the spectrometer 215 is positioned to measure an example second spectrum 312 of an interior of the payload compartment 291 by directing the emission 218 from the spectrometer 215 toward a reflector 310 disposed in the payload compartment 291. In some examples, the spectrometer 215 is positioned in the first position (FIG. 3A) to measure the first spectrum 219 prior to conveyance of the container 210 bearing the payload 211. In some examples, the reflector 310 is disposed at a bottom portion of the interior of the payload compartment 291. In some examples, a bottom portion of the interior of the payload compartment 291 is sloped to direct any spillage of the payload 211, via gravity, toward a lower portion of the payload compartment 291 and, in some examples, the reflector 310 is disposed at this lower portion of the payload compartment 291.

To illustrate an example operation of the drone 293 in accordance with the example of FIGS. 3A-3B, the drone 293 arrives at a pick-up location and receives the container 210 bearing the payload 211 within the payload compartment 291. The payload retainer 296 (not shown) secures the container 210 relative to the payload compartment 291 with the transparent portion 217 of the container 210 positioned to receive the emission 218 of the spectrometer 215. Prior to disembarking with the container 210, the spectrometer 215 obtains the first spectrum 219 of the payload 211. The payload verifier 225 then compares the first spectrum 219 with a reference spectrum from the spectrum data 270 that corresponds to the declared payload as identified in the payload data 238. If a match is verified by the payload verifier 225 (e.g., the first spectrum 219 at least substantially corresponds to the reference spectrum for the declared payload), the drone 293 is enabled to continue operation to transport the container 210 to the destination location or an intermediary location. In some examples, if a match is not verified by the payload verifier 225, the drone 293 is not permitted to disembark unless the container 210 is removed. Following verification of the payload 211, the drone 293 of FIGS. 3A-3B then repositions the spectrometer 215 via the gimbal 305 and/or via an actuator, to permit the spectrometer 215 to obtain the second spectrum 312, which provides a baseline measurement of an interior in the payload compartment 291. The drone 293 then initiates transport the container 210 to the destination location. During the transport of the container 210 to the destination location, the payload verifier 225 causes the spectrometer 215 to measure the second spectrum 312 again to determine if there is any significant change in the interior of the payload compartment 291 relative to the baseline reading of the second spectrum 312. For instance, the payload verifier 225 can look for indications of the payload 211 in the interior of the payload compartment 291 (e.g., leakage of a liquid from the container 210, leakage of a gas from the container 210, leakage of a solid from the container 210).

Figure 3C:
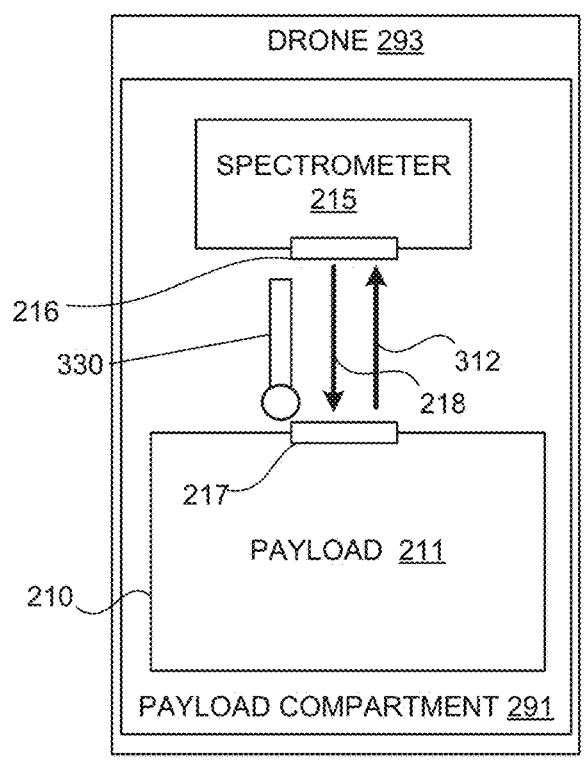
FIGS. 3C-3D illustrate a second example implementation of a drone using an example spectrometer within an example payload compartment in accordance with some teachings of this disclosure.
Figure 3D:
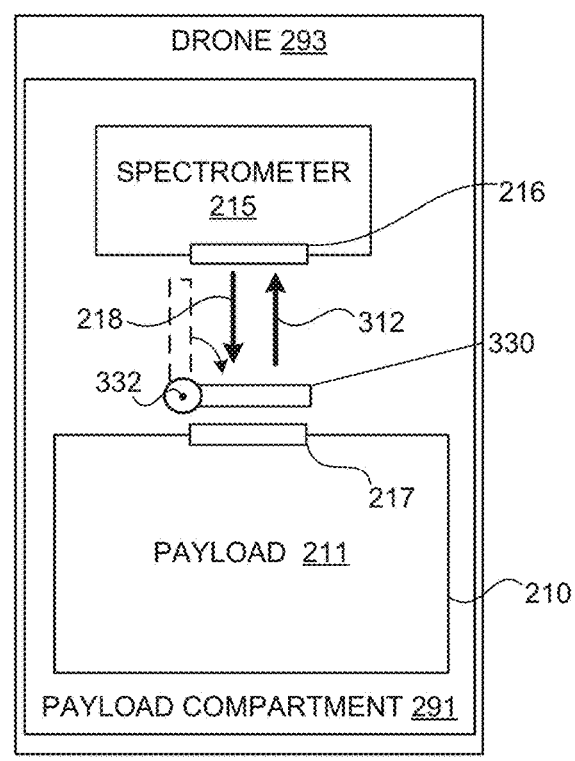

FIGS. 3C-3D illustrate a second example implementation of the drone 293 of FIG. 2D, which includes the spectrometer 215 within the payload compartment 291. In the example implementation of FIGS. 3C-3D, the drone 291 includes an example reflector 330, which may include a mirror or a reflector, rotatably mounted about an example axis 332 to allow rotation of the reflector 330 between an example first position (corresponding to FIG. 3C) and an example second position (corresponding to FIG. 3D). Additionally or alternatively, the reflector 330 is mounted on an actuator to laterally translate the reflector 330 between a first position (corresponding to FIG. 3C) and the second position (corresponding to FIG. 3D). In the first position of FIG. 3C, the reflector 330 is positioned to allow the spectrometer 215 to measure the first spectrum 219 of the payload 211. In the second position of FIG. 3D, the reflector 330 is positioned to cause the spectrometer 215 to measure the second spectrum 312 of the interior of the payload compartment 291. In some examples, the reflector 330 is positioned in the first position (FIG. 3C) to cause the spectrometer 215 to measure the first spectrum 219 prior to conveyance of the container 210 bearing the payload 211. In the second position of FIG.

3D, the reflector 330 is positioned to cause the spectrometer 215 to measure the second spectrum 312 of an interior of the payload compartment 291 by interposing the reflector 330 into an optical pathway between the emission outlet 216 of the spectrometer 215 and the transparent portion 217 of the container 210. Operation of the drone 293 of FIGS. 3C-3D is similar to that described above in relation to FIGS. 3A-3B.

In some examples, the reflector 330 is disposed at a bottom portion of the interior of the payload compartment 291. In some examples, a bottom portion of the interior of the payload compartment 291 is sloped to direct any spillage of the payload 211, via gravity, toward a lower portion of the payload compartment 291 and, in some examples, the reflector 330 is disposed at this lower portion of the payload compartment 291.

Figure 3E:
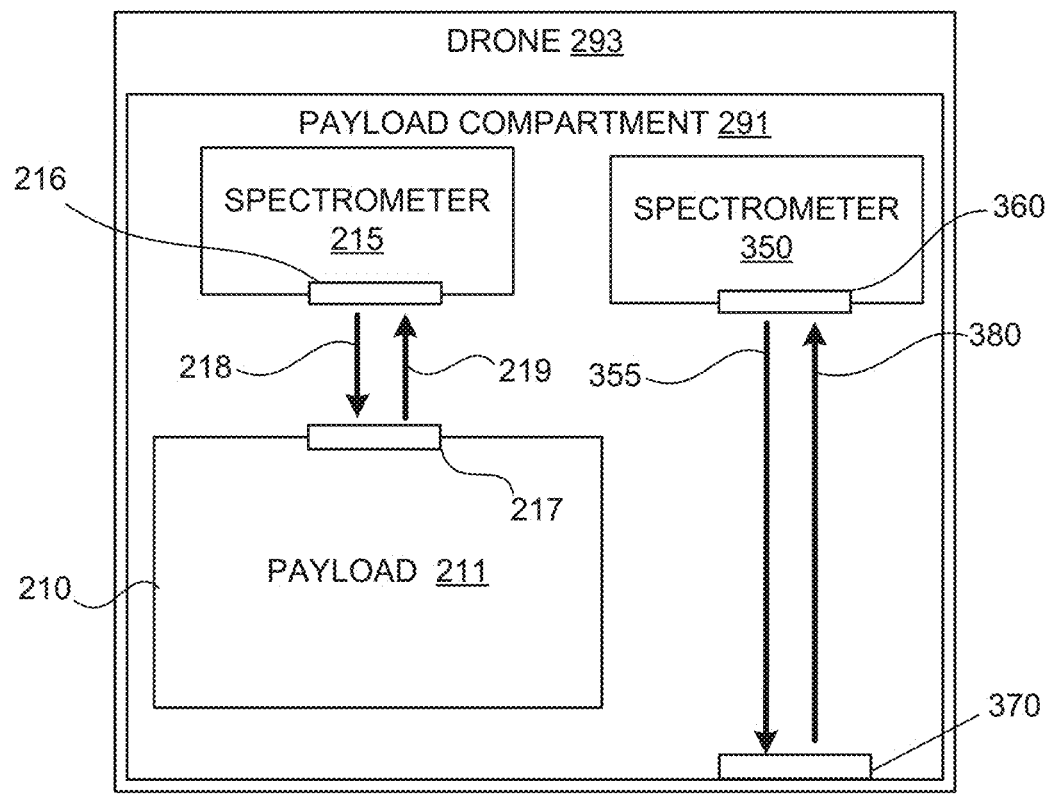
FIG. 3E illustrates a third example implementation of a drone using an example spectrometer within an example payload compartment in accordance with some teachings of this disclosure.

FIG. 3E illustrates a third example implementation of the drone 293 of FIG. 2D, which includes not only the spectrometer 215 to measure the first spectrum 219 of the payload 211, but also includes an example second spectrometer 350. The second spectrometer 350 is to output an example emission 355 of light (e.g., a laser light, etc.) of a predetermined wavelength (e.g., a wavelength ranging from ultra-violet through visible to near infra-red, etc.) through an example emission outlet 360. The emission outlet 360 is structured to output an emission 355 in a direction of a reflector 370 positioned in a bottom portion of the payload compartment 291 to obtain a baseline measurement of the example second spectrum 380 of an interior in the payload compartment 291, as well as subsequent measurements of the second spectrum 380.

Figure 4:
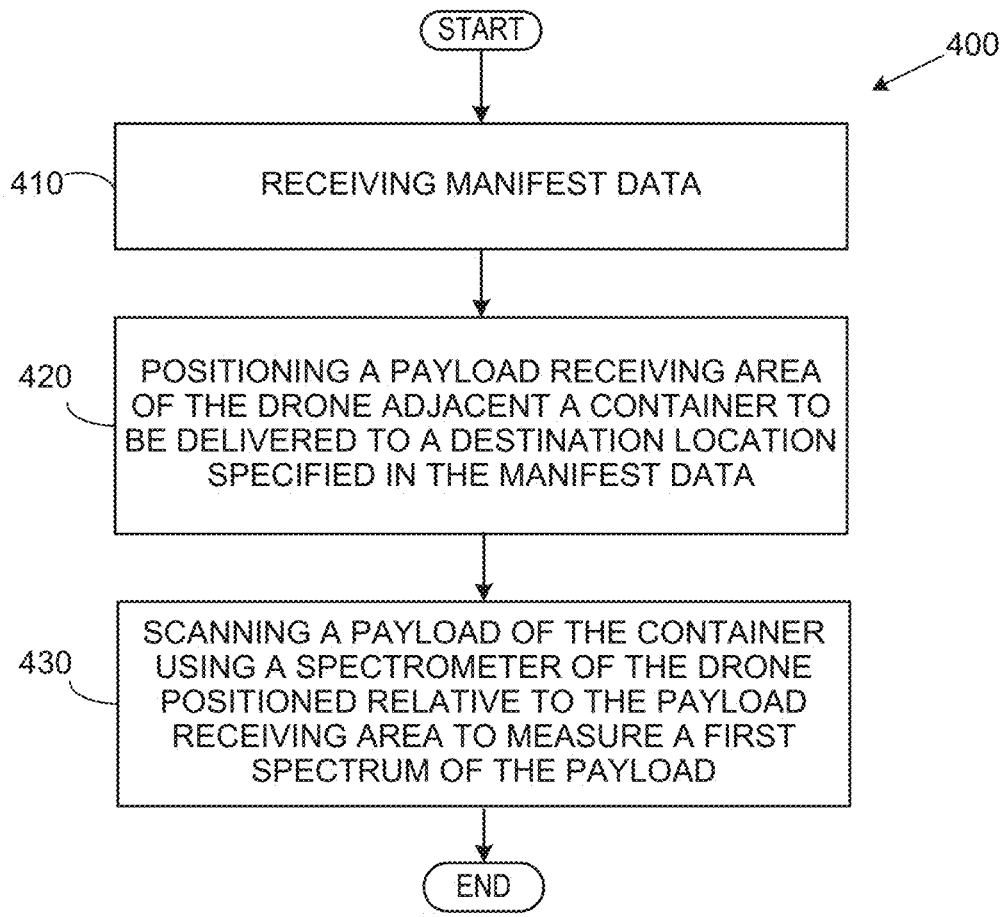
FIG. 4 presents a flowchart representation of computer-executable instructions, which may be executed to implement the example drones of FIGS. 2A, 2C-2F, the example drones of FIGS. 3A-3E and/or the example payload verifier of FIG. 2C.
Figure 5A:
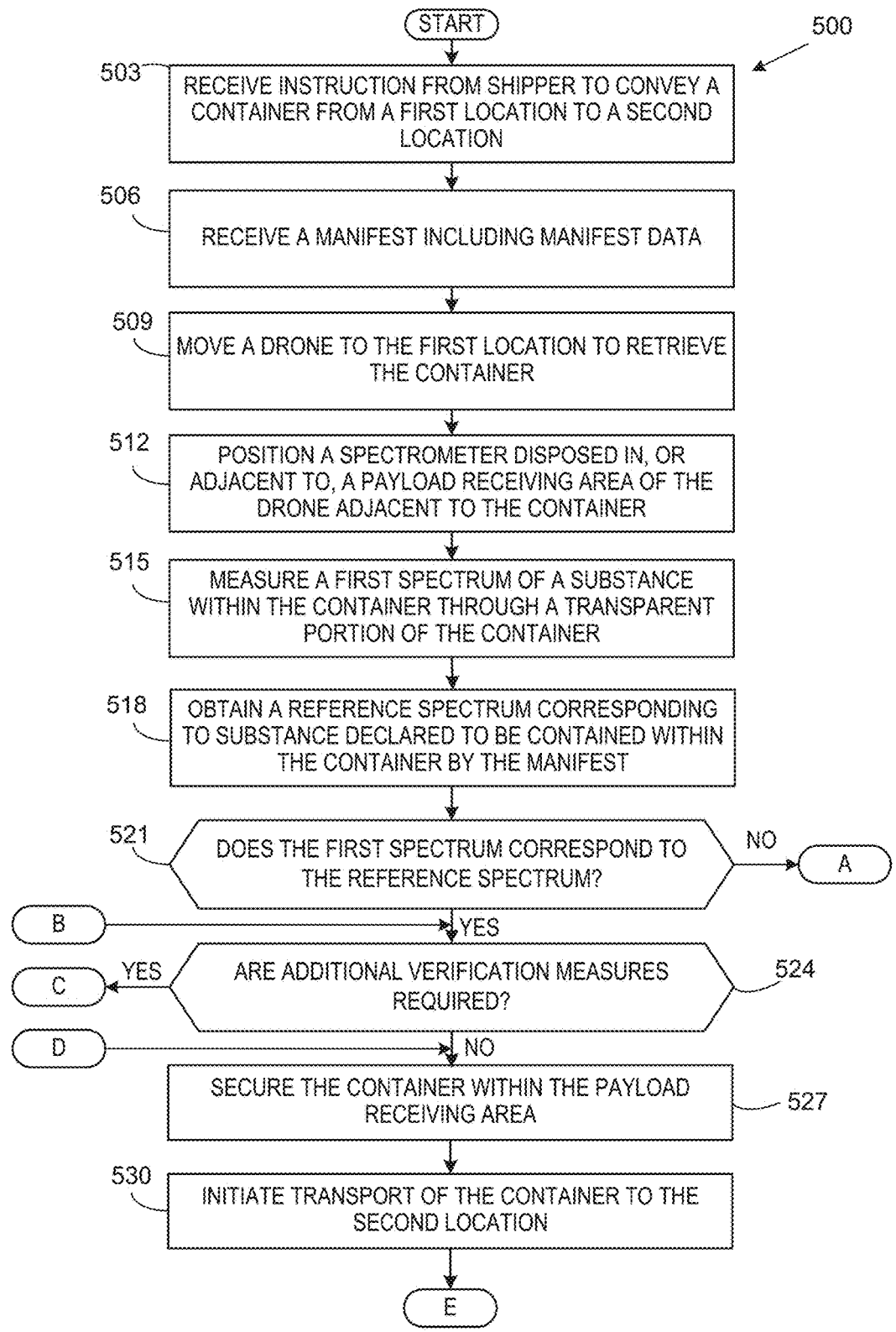
FIGS. 5A-5D present a flowchart representation of computer-executable instructions, which may be executed to implement the example drones of FIGS. 2A, 2C-2F, the example drones of FIGS. 3A-3E and/or the example payload verifier of FIG. 2C.
Figure 5B:
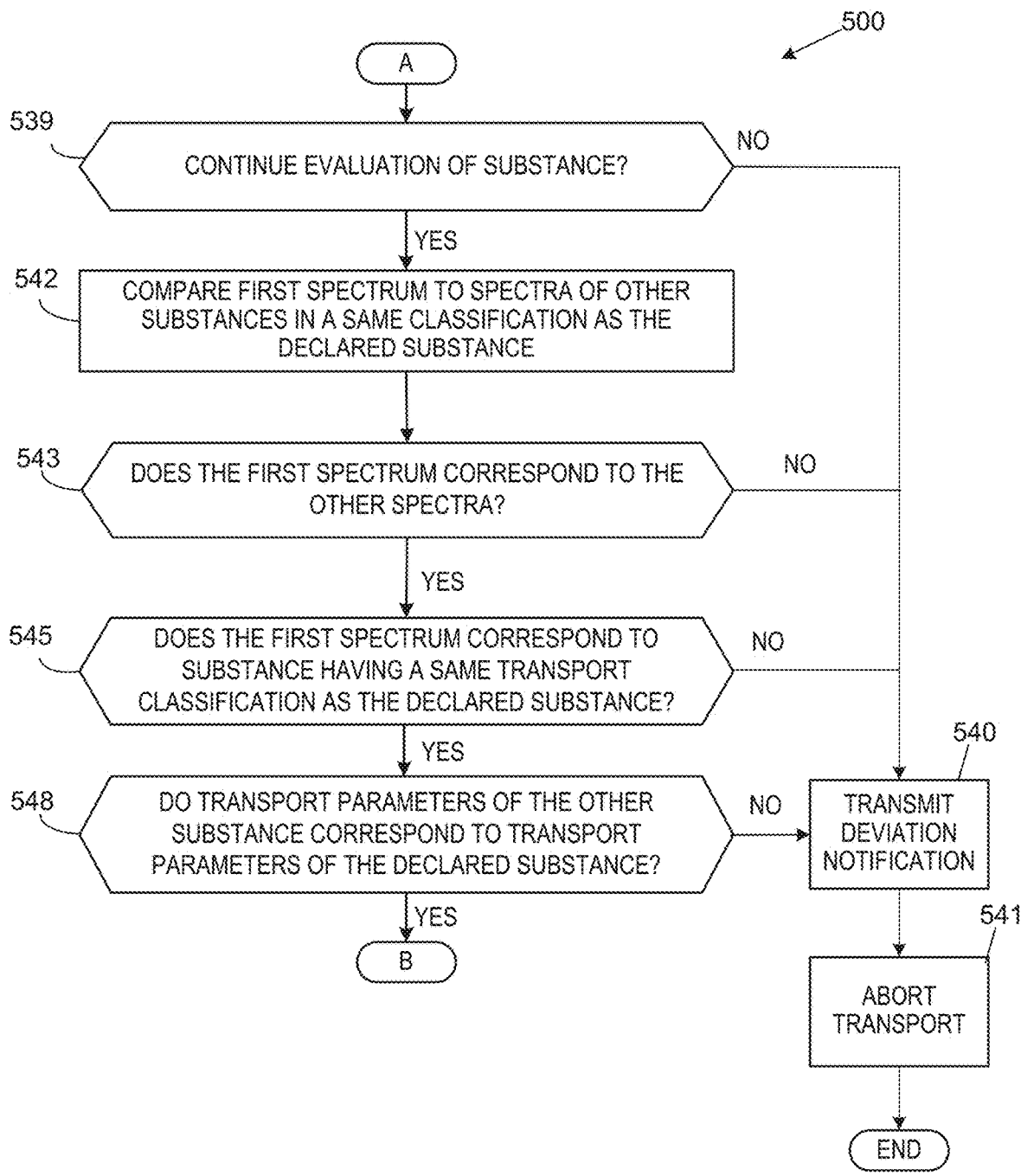
Figure 5C:
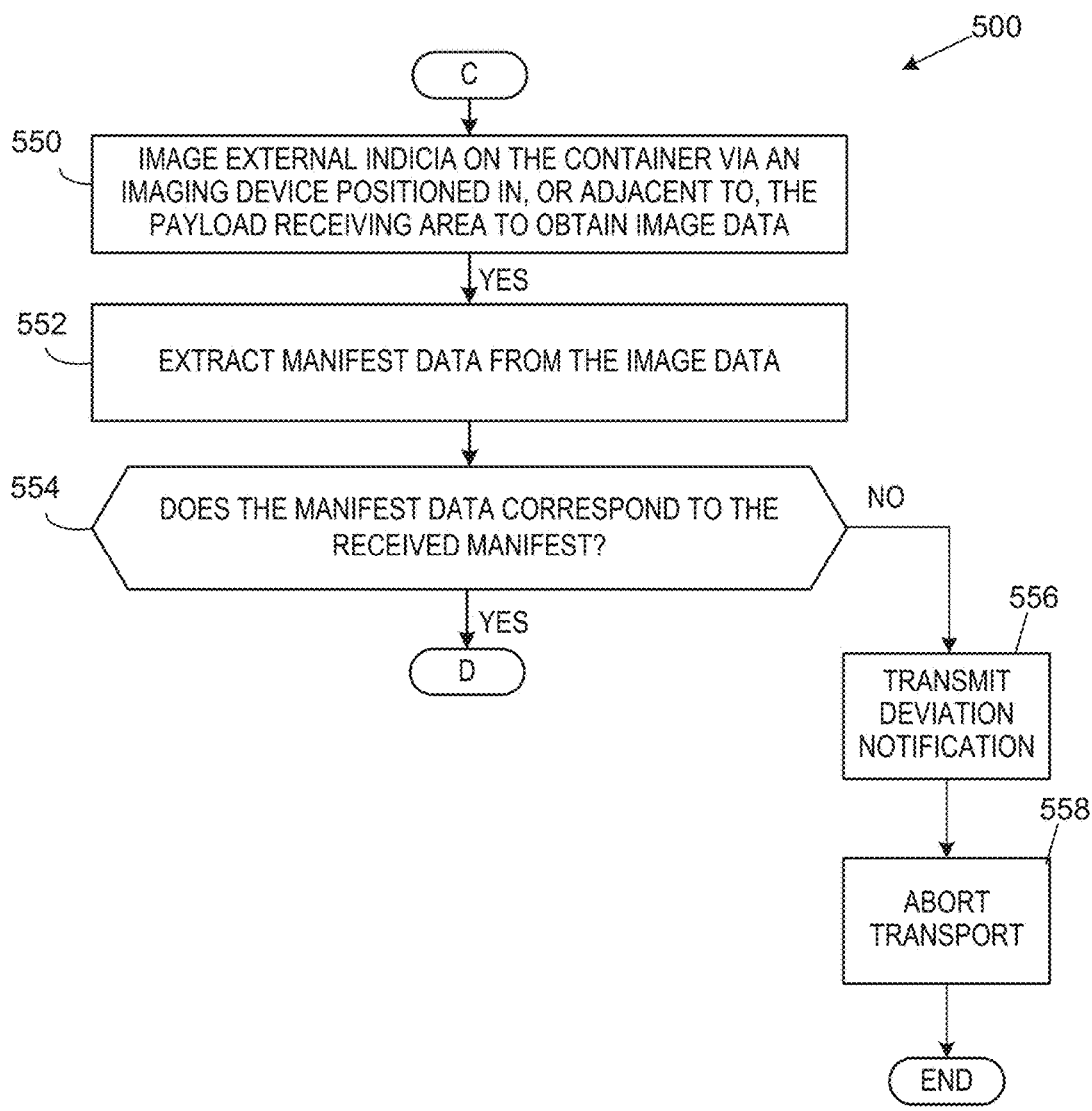

FIG. 4 presents an example flowchart representation of computer-executable instructions, which may be executed to implement the example drones of FIGS. 2A, 2B and 2D, the example drones of FIGS. 3A-3E and/or the example payload verifier 225. FIGS. 5A-5C present a flowchart representative of example machine readable instructions for implementing the drones 200, 293 of FIGS. 2A, 2B, 2D and 3A-3E with the example payload verifier 225. In these examples of FIG. 4 and FIGS. 5A-5D, the machine readable instructions comprise a program for execution by a processor such as the processor 612 shown in the example processor platform 600 discussed below in connection with FIGS. 6A-6B. The program may be embodied in software stored on a non-transitory computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIG. 4 and FIGS. 5A-5C, many other methods of implementing the drones 200, 293 of FIGS. 2A, 2B, 2D and 3A-3E with a payload verifier 225, such as the payload verifier 225 of FIG. 2C, may additionally or alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 4 and FIGS. 5A-5C may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example program 400 of FIG. 4 begins at block 410 with the receiving of manifest data from a shipper or other party by the drone 200, 293 and/or by the external system 250. The manifest data 235 may include origination data 236, destination data 237 and/or payload data 238. In some examples, the manifest data 235 includes a first (origination) location of the container 210 to be borne by the drone 200, 293. The manifest data 235 received at block 410 advantageously includes payload data 238 (e.g., container 210 weight, container 210 dimension(s), payload 211, etc.) and destination data 237 (e.g., a destination location, which provides information on a flight time and permissible flight path(s)).

At block 420 of FIG. 4, the drone 200, 293 positions the payload receiving area 209, or the payload compartment 291, adjacent the container 210 to be delivered to a destination location specified in the manifest data 235 (e.g., specified by destination data 237, which may include a destination location, map coordinates, landmarks, flight path(s), flight schedule(s), etc.).

In some examples, at block 430 in the illustrated example of FIG. 4, the drone 200, 293 uses the spectrometer 215, positioned relative to the payload receiving area 209, to scan a payload of the container 210 and measure a first spectrum 219 of the payload.

The example program 500 of FIGS. 5A-5D begins at block 503 of FIG. 5A with the receipt of an instruction from a shipper or other party to use the drone 200, 293 to convey the container 210 from a first location (e.g., a pick-up location) to a second location (e.g., a destination location). At block 506, a manifest including manifest data 235 is received by the drone 200, 293 and/or by the external system 250. The manifest data 235 may include origination data 236, destination data 237 and/or payload data 238. In some examples, the manifest data 235 includes a first (origination) location of the container 210. The manifest data 235 received at block 506 advantageously includes payload data 238 (e.g., container 210 weight, container 210 dimension(s), payload 211, etc.) and destination data 237 (e.g., a destination location, which provides information on a flight time and permissible flight path(s)).

At block 509 of FIG. 5A, the drone 200, 293 suitable for the carriage indicated by the manifest data 235 is dispatched to the first location indicated by the origination data 236. At block 512, the spectrometer 215 of the drone 200, 293 is positioned adjacent to or otherwise in a position to measure/analyze the container 210.

The payload verifier 225, via the spectrometer driver 286, initializes the spectrometer 215 to enable acquisition of spectroscopic data from the container 210 and, at block 515, the spectrometer 215 measures an first spectrum 219 of the payload 211 through an transparent portion 217 of the container 210 following emission of an emission 218 through the transparent portion 217.

At block 518, a reference spectrum corresponding to the payload 211 declared in the manifest data 235 to be contained within the container 210 is obtained for purposes of comparison to the measured first spectrum 219 by the payload verifier 225. The reference spectrum may be obtained from spectrum data 270 resident in the drone 200, 293 or resident in an external system 250. In some examples, the reference spectrum may be obtained from the network 271 or the Internet 272.

At block 521, the payload verifier 225 and/or the material spectrum analyzer 260 compare the first spectrum 219 to the reference spectrum using one or more spectrum comparison techniques (e.g., characteristic Raman frequencies comparison, Principal Component Analysis (PCA), Spectral Angle Mapping (SAM), Mel Frequency Cepstrum Coefficients, Linear Discriminant Analysis, Cross-Correlation of the raw spectral data between measured and stored spectra, etc.) to determine a level of correspondence (e.g., statistical correlation, etc.) within a desired confidence interval (90% confidence interval, 95% confidence interval, etc.). If the result of block 521 is negative (block 521="NO"), control passes to block 539 of FIG. 5B. If the result of block 521 is in the affirmative (block 521="YES"), control passes to block 524 of FIG. 5A.

At block 524 of FIG. 5A, the payload verifier 225 determines whether additional verification measures are required. If the result of block 524 is negative (block 524="NO"), control passes to block 527. If the result of block 524 is in the affirmative (block 524="YES"), control passes to block 540 of FIG. 5C.

At block 527, following verification by the payload verifier 225 of the correspondence of the first spectrum 219 to the payload 211 declared in the manifest data 235, the drone 200, 293 secures the container 210 in the payload compartment 291, via the payload retainers 208, 296, in preparation for transport.

At block 530, the payload verifier 225 clears the drone 200, 293 to initiate transport of the container 210 to the second location. Control then passes to block 560 of FIG. 5D.

If the result at block 521 is negative (block 521="NO") arising from a failed comparison of the first spectrum 219 to the reference spectrum, control passes to block 539 of FIG. 5B.

At block 539, the payload verifier 225 determines whether continued evaluation of the payload 211 is to be performed. If the result at block 539 is negative (block 539="NO"), control passes to block 540 the drone 200, 293 transmits a deviation notification to the external system 250 and/or the shipper or third-party associated with the request or order to transport the container 210. Following the transmission of the deviation notification, the drone 200, 293 disengages from the container 210 and aborts the request or order to transport the container 210 at block 541.

If the result of block 539 is positive (block 539="YES"), the payload verifier 225 passes control to block 542, where the payload verifier 225 compares the first spectrum 219 to spectra representative of other substances, starting with substances than may reside in a same general classification as that of a substance corresponding to the declared payload 211. For instance, if the declared payload 211 is benzene, the other spectra to which the first spectrum 219 are initially compared may include other hydrocarbons.

At block 543, the payload verifier 225 compares the first spectrum 219 to spectra for other substances, starting with substances that reside in a same classification as the declared payload 211 and/or the first spectrum 219, using spectrum comparison techniques to determine a level of correspondence within a desired confidence interval. If the result of block 543 is negative (block 543="NO"), control passes to block 540 where the drone 200, 293 transmits a deviation notification to the external system 250 and/or the shipper or third-party associated with the request or order to transport the container 210 and then to block 541 where the drone 200, 293 aborts the request or order to transport the container 210. If the result of block 543 is in the affirmative (block 543="YES"), control passes to block 545 of FIG. 5B.

At block 545, the payload verifier 225 determines whether the first spectrum 219 corresponds to a substance that has a same transport classification as the substance indicated by the first spectrum 219. In other words, the payload verifier 225 determines whether the difference in classification between the actual payload and the declared payload 211 from the manifest data 235 is material as to local, state and/or Federal transportation regulations (e.g., the Hazardous Materials Transportation Control Act of 1970, Department of Transportation regulations, Federal Aviation Administration regulations, etc.).

If, at block 548, the payload verifier 225 determines that the transportation classification of the payload 211 corresponding to the measured first spectrum 219 is the same as a transportation classification of the payload declared in the manifest data 235 (block 548="YES"), the payload verifier 225 may permit the carriage to proceed even though the actual payload is different than the declared payload and control passes to block 524 of FIG. 5A. In some examples, the drone 200, 293 is to transmit a deviation notification to the external system 250 and/or the shipper or third-party associated with the request or order to transport the container 210 to obtain further instruction prior to the payload verifier 225 passing control to block 524 of FIG. 5A.

If the transportation classification of the actual payload 211 (i.e., the substance corresponding to the measured first spectrum 219) is not the same as a transportation classification of the declared payload in the manifest data 235 (block 548="NO"), the payload verifier 225 passes control to blocks 540, 541 of FIG. 5B, where the drone 200, 293 transmits a deviation notification to the external system 250 and/or the shipper or third-party associated with the request or order to transport the container 210 and aborts the transport of the container 210. In some examples, following transmission of the deviation notification by the drone 200, 293 to the external system 250 and/or the shipper or third-party associated with the request or order to transport the container 210, the drone 200, 293 awaits further instruction prior to aborting the transport of the container 210.

In FIG. 5C, following an affirmative result at block 524 of FIG. 5A (block 524="YES"), the payload verifier 225 uses the manifest reader 282 and the imaging system driver 284 to image external indicia on the container 210 at block 540 via one or more imaging devices, such as the CCD camera 292 and/or the IR camera 290. At block 542, the manifest reader 282 then extracts the manifest data 235, such as through application of digital image processing, edge detection and OCR techniques to the image data from block 542.

At block 544, the payload verifier 225 determines whether the manifest data 235 obtained via the one or more imaging devices and the manifest reader 282 corresponds to the manifest data 235 obtained at block 506. If a return at block 544 is affirmative (block 544="YES"), control passes to block 527 of FIG. 5A. If a return at block 544 is negative (block 544="NO"), control passes to block 546, where the drone 200, 293 transmits a deviation notification to the external system 250 and/or the shipper or third-party associated with the request or order to transport the container 210. Following the transmission of the deviation notification at block 546, the drone 200, 293 disengages from the container 210 and aborts the request or order to transport the container 210 at block 558.

Figure 5D:
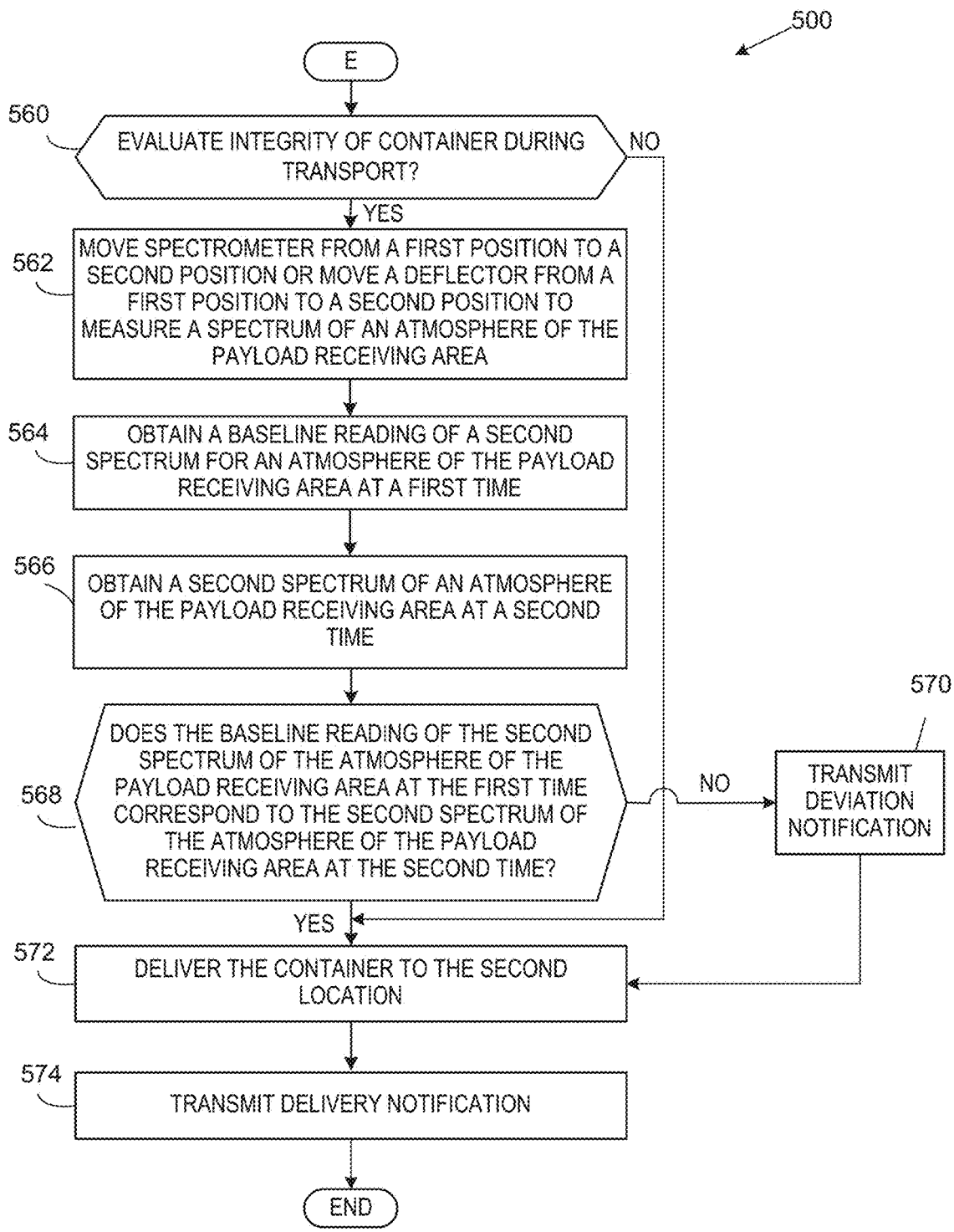
Figure 6A:
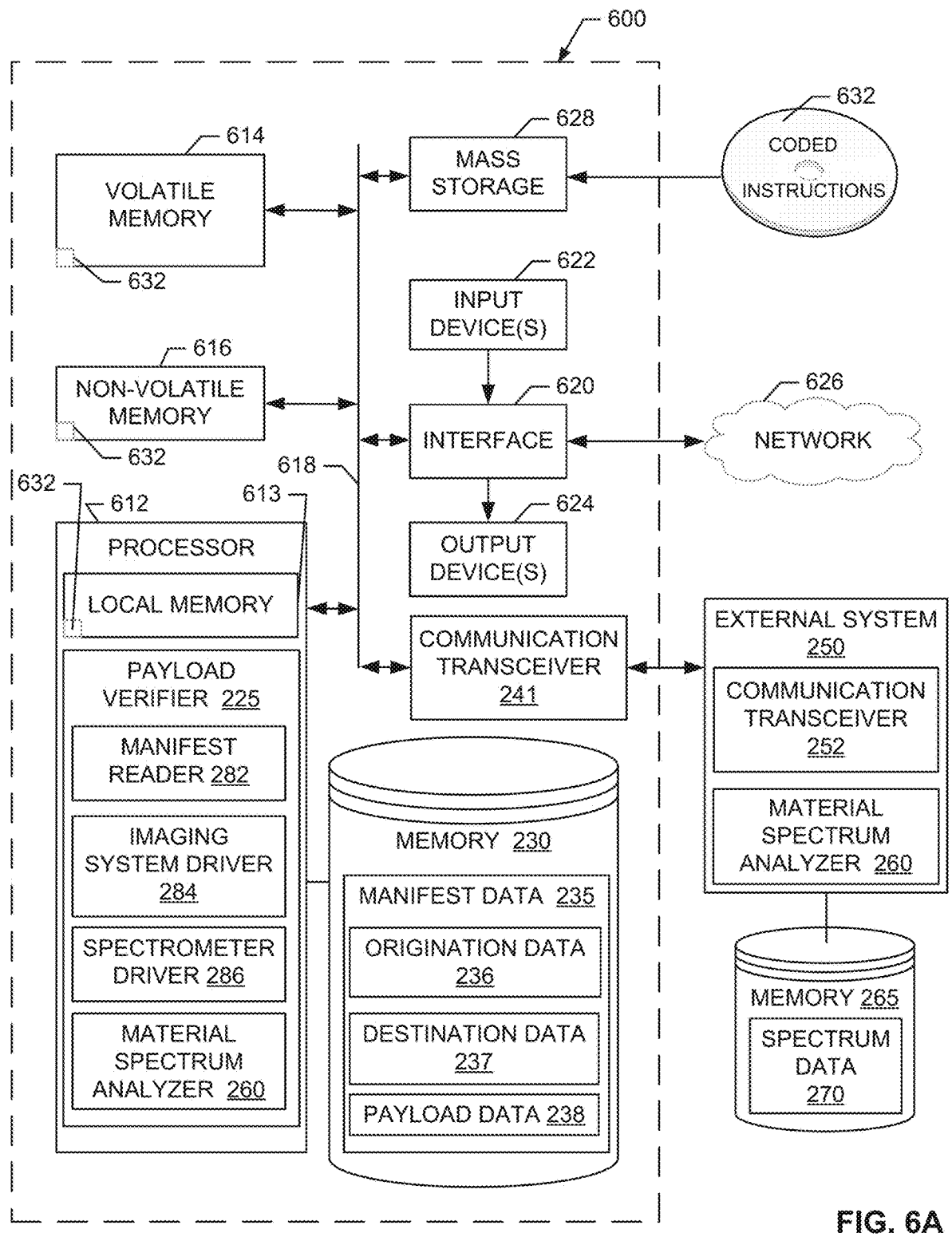
FIGS. 6A-6B are block diagrams illustrating example processor platforms structure to execute the instructions of FIGS. 5A-5D to implement the example drones of FIGS. 2A, 2C-2F, the example drones of FIGS. 3A-3E and/or the example payload verifier of FIG. 2C.
Figure 6B:
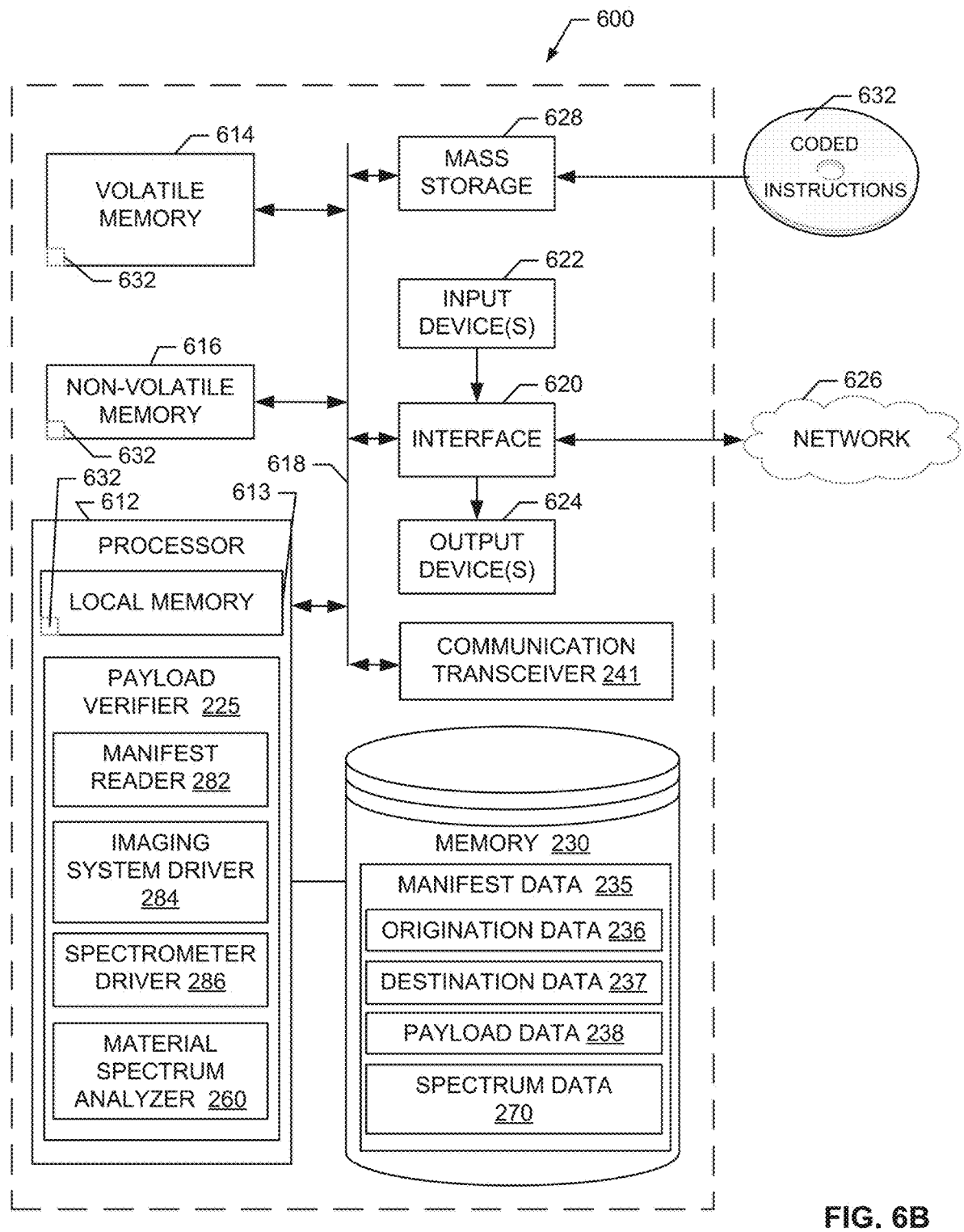

Contemporaneous to initiation of transport of the container 210 to the second location at block 530 of FIG. 5A, at block 560 of FIG. 5D the payload verifier 225 may be required to evaluate the integrity of the container 210 during transport to the second location. If the payload verifier 225 is required to evaluate the integrity of the container 210 during transport of the container 210 to the second location (block 560="YES"), such as may be regulatorily required for a particular classification the payload 211 and/or a particular route or corridor of transport, control passes to block 562. If the payload verifier 225 is not required to evaluate the integrity of the container 210 during transport of the container 210 to the second location at block 560 (block 560="NO"), control passes to block 572.

At block 562, the payload verifier 225 moves the spectrometer 215 from a first position to a second position (see, e.g., FIGS. 3A-3B) or moves the reflector 330 from a first position to a second position (see, e.g., FIGS. 3C-3D) to measure an second spectrum 312, 380 of an interior of the payload compartment 291.

At block 564, the payload verifier 225 and the spectrometer driver 286 cause the spectrometer 215, or the second spectrometer 350, to obtain the second spectrum 312, 380 of an interior of the payload compartment 291 at a first time to establish a baseline reading for the second spectrum 312, 380. In some examples, this second time is generally contemporaneous with the securing of the container 210 within the payload compartment 291 at block 527 and the initiation of transport of the container 210 at block 530.

At block 566, the payload verifier 225 and the spectrometer driver 286 cause the spectrometer 215, or the second spectrometer 350, to obtain the second spectrum 312, 380 of an interior of the payload compartment 291 at a second time subsequent to the first time.

At block 568, the payload verifier 225 and the material spectrum analyzer 260 compare the baseline reading for the second spectrum 312, 380 of the interior of the payload compartment 291 at the first time to the second spectrum 312, 380 of the interior of the payload compartment 291 at the second time to determine if there is a material difference in the second spectrum 312, 380 over time indicative of leakage of the payload 211 from the container 210. If the return at block 568 is negative (block 568="NO"), the drone 200, 293 transmits a deviation notification at block 570 providing information regarding the material difference between the readings of the second spectrum 312, 380 between the first time and the second time. If the return at block 568 is affirmative (block 568="YES"), the drone 200, 293 continues with the transport of the container 210. In some examples, the payload verifier 225 periodically and/or aperiodically implements block 566 and block 568 during transport to periodically monitor an integrity of the container 210 over time. In this manner, the external system 250 and/or the payload verifier 225 can continue to renew authorization of continued flight of the drone 200, 293 along a designated route to the destination location.

At block 574, the drone 200, 293 transmits a delivery notification representing a successful delivery of the container 210 to the external system 250 and/or the shipper or third-party associated with the request or order to transport the container 210.

FIG. 10 is a block diagram of an example processor platform 600 structured to execute the instructions of FIGS. 5A-5B to implement the drone 200, 293 of FIGS. 2A, 2C and 3A-3D and/or the payload verifier 225 of FIG. 2C. The processor platform 600 can be, for example, a server, a personal computer, a mobile device (e.g., a cell phone, a smart phone, a tablet such as an iPad™), a personal digital assistant (PDA), an Internet appliance, a personal video recorder, a camera, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor may be a semiconductor based (e.g., silicon based) device. In this example, the processor implements the payload verifier 225, the manifest reader 282, the imaging system driver 284, the spectrometer driver 286 and/or the material spectrum analyzer 260 of FIGS. 2A-2D.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 636 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 5A-5D may be stored in the mass storage device 628, in the volatile memory 614, in the non-volatile memory 616, and/or on a removable tangible computer readable storage medium such as a CD or DVD.

From the foregoing, it will be appreciated that example methods, apparatus and articles of manufacture have been disclosed that enhance the safety of drone carriage operations by verifying that the payload to be carried by a drone matches the payload declared in a shipping manifest, by verifying that a condition of the payload does not adversely change during transport and/or by preventing a fraudulent or inaccurate shipping manifest from enabling the conveyance of hazardous materials, which could cause harm in the event of an accident or failure of the drone.

Example 1 is a drone including a payload receiving area to receive a container, a payload retainer to secure the container relative to the payload receiving area and a spectrometer positioned relative to the payload receiving area to measure a first spectrum of a payload within the container.

Example 2 includes the drone of Example 1, wherein the first spectrum is measured by the spectrometer through a transparent portion of the container disposed opposite an emission outlet of the spectrometer.

Example 3 includes the drone as defined in any of Examples 1-2, wherein the payload receiving area defines a payload compartment to receive the container and includes a door movable between an open position providing access to the payload compartment and a closed position enclosing the payload compartment.

Example 4 includes the drone as defined in any of Examples 1-3, wherein a junction between the payload compartment and the door includes a seal to hermetically seal the payload compartment when the door is in the closed position.

Example 5 includes the drone as defined in any of Examples 1-4, and further includes a payload verifier to compare the first spectrum of the payload to a reference spectrum for a payload declared in a payload manifest.

Example 6 includes the drone as defined in any of Examples 1-5, wherein the payload verifier is further to enable conveyance of the container by the drone following a verified match between the first spectrum and the reference spectrum and abort conveyance of the container by the drone following a failure to match the first spectrum and the reference spectrum.

Example 7 includes the drone as defined in any of Examples 1-6, and further includes an imaging device positioned relative to the payload receiving area to obtain image data from the container and to output the image data to the payload verifier.

Example 8 includes the drone as defined in any of Examples 1-7, wherein the image data includes at least one of indicia on the container or a payload manifest disposed on the container.

Example 9 includes the drone as defined in any of Examples 1-8, and further includes a reflector movable between a first position out of an optical pathway between the spectrometer and the container and a second position in an optical pathway between the spectrometer and the container.

Example 10 includes the drone as defined in any of Examples 1-9, wherein the first position permits measurement of the first spectrum and the second position permits measurement of a second spectrum of an interior of the payload compartment.

Example 11 includes the drone as defined in any of Examples 1-10, wherein the payload receiving area defines a payload compartment to receive the container, and wherein the spectrometer is movable between a first position in which the spectrometer is positioned to measure the first spectrum and a second position in which the spectrometer is positioned to measure a second spectrum of an interior of the payload compartment.

Example 12 includes the drone as defined in any of Examples 1-11, wherein the spectrometer is to measure the second spectrum during conveyance of the container from a pick-up location to a destination location.

Example 13 includes the drone as defined in any of Examples 1-12, and further includes a communication device, wherein the payload verifier is to transmit the first spectrum to an external system via the communication device.

Example 14 is a drone including a payload receiving area to receive a container, payload retainer means to secure the container relative to the payload receiving area and spectrometer means positioned relative to the payload receiving area to measure a first spectrum of a payload within the container.

Example 15 includes the drone as defined in Example 14, wherein the first spectrum is returned to the spectrometer through a transparent portion of the container disposed opposite an emission outlet of the spectrometer, and the payload receiving area includes payload compartment means.

Example 16 includes the drone as defined in any of Examples 14-15, and further includes payload verifier means to compare the first spectrum to a reference spectrum for a payload declared in a payload manifest.

Example 17 includes the drone as defined in any of Examples 14-16, wherein the payload verifier means is to enable conveyance of the container following a verified match between the first spectrum and the reference spectrum.

Example 18 includes the drone as defined in any of Examples 14-17, and further includes imaging means positioned relative to the payload receiving area to obtain image data from indicia on the container or from the container, and to output the image data to the payload verifier means.

Example 19 is a method of implementing a drone, the method including receiving manifest data, positioning a payload receiving area of the drone adjacent a container to be delivered to a destination location specified in the manifest data and scanning a payload of the container using a spectrometer of the drone positioned relative to the payload receiving area to measure a first spectrum of the payload.

Example 20 includes the method as defined in Example 19, wherein the scanning includes directing an emission from an emission outlet of the spectrometer through a transparent portion of the container disposed opposite the emission outlet.

Example 21 includes the method as defined in any of Examples 19-20, and further includes verifying that the first spectrum matches a reference spectrum corresponding to the payload, conveying the container following a verified match between the first spectrum and the reference spectrum and aborting conveyance of the container following a failure to match the first spectrum and the reference spectrum.

Example 22 includes the method as defined in any of Examples 19-21, wherein the spectrometer is a first spectrometer, and further including measuring a second spectrum of an interior of a payload compartment bearing the container, the measuring performed with the first spectrometer or a second spectrometer, the measuring of the second spectrum of the interior of the payload compartment performed prior to conveyance of the container to obtain a baseline for the second spectrum, and the measuring of the second spectrum of the interior of the payload compartment performed during conveyance of the container from a pick-up location to the destination location.

Example 23 is a non-transitory machine readable medium comprising executable instructions that, when executed, cause at least one processor to at least measure a first spectrum of a payload within a container positioned adjacent a payload receiving area of a drone using a first spectrometer positioned relative to the payload receiving area, compare the first spectrum of the payload to a reference spectrum for a payload declared in a payload manifest and cause a payload retainer to secure the container relative to the payload receiving area following a verified match between the first spectrum and the reference spectrum.

Example 24 includes the non-transitory machine readable medium as defined in Example 23, further including executable instructions that, when executed, cause the at least one processor to cause the first spectrometer, or a second spectrometer positioned relative to the payload receiving area of the drone, to measure a second spectrum of an interior of a payload compartment of the payload receiving area during transport of the container to a destination location.

Example 25 includes the non-transitory machine readable medium as defined in any of Examples 23-24, further including executable instructions that, when executed, cause the at least one processor to cause an imaging device positioned relative to the payload receiving area of the drone to image the container in the payload compartment during transport of the container to a destination location.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A drone comprising:
a payload receiving area to receive a container;
a payload retainer to secure the container relative to the payload receiving area;
a spectrometer positioned relative to the payload receiving area to measure a first spectrum of a payload within the container;
a payload verifier to compare the first spectrum of the payload to a reference spectrum associated with the payload; and
an imaging device positioned relative to the payload receiving area to obtain image data from the container and to output the image data to the payload verifier, the image data including at least one of indicia on the container or a payload manifest disposed on the container.

2. A drone comprising:
a payload receiving area to receive a container;
a payload retainer to secure the container relative to the payload receiving area;
a spectrometer positioned relative to the payload receiving area to measure a first spectrum of a payload within the container; and
a reflector movable between a first position associated with a first optical pathway between the spectrometer and the container and a second position associated with a second optical pathway between the spectrometer and the container.

3. A drone comprising:
a payload receiving area to receive a container;
a payload retainer to secure the container relative to the payload receiving area, and
a spectrometer positioned relative to the payload receiving area to measure a first spectrum of a payload within the container,
the payload receiving area defining a payload compartment to receive the container, the spectrometer movable between a first position in which the spectrometer is positioned to measure the first spectrum and a second position in which the spectrometer is positioned to measure a second spectrum of an interior of the payload compartment.

4. The drone of claim 2, wherein the first spectrum is measured by the spectrometer through a transparent portion of the container disposed opposite an emission outlet of the spectrometer.

5. The drone of claim 3, wherein the payload receiving area includes a door movable between an open position providing access to the payload compartment and a closed position enclosing the payload compartment.

6. The drone of claim 5, wherein a junction between the payload compartment and the door includes a seal to hermetically seal the payload compartment when the door is in the closed position.

7. The drone of claim 1, wherein the payload verifier is to:
enable conveyance of the container by the drone following a verified match between the first spectrum and the reference spectrum; and
abort conveyance of the container by the drone following a failure to match the first spectrum and the reference spectrum.

8. The drone of claim 2, wherein the first position permits measurement of the first spectrum and the second position permits measurement of a second spectrum of an interior of the container.

9. The drone of claim 3, wherein the spectrometer is to measure the second spectrum during conveyance of the container from a pick-up location to a destination location.

10. The drone of claim 1, further including a communication device, wherein the payload verifier is to transmit the first spectrum to an external system via the communication device.

* * * * *